Aug. 25, 1931.  L. O. B. LINDSTROM ET AL  1,820,357
VISION TONE DEVICE
Filed Feb. 15, 1929
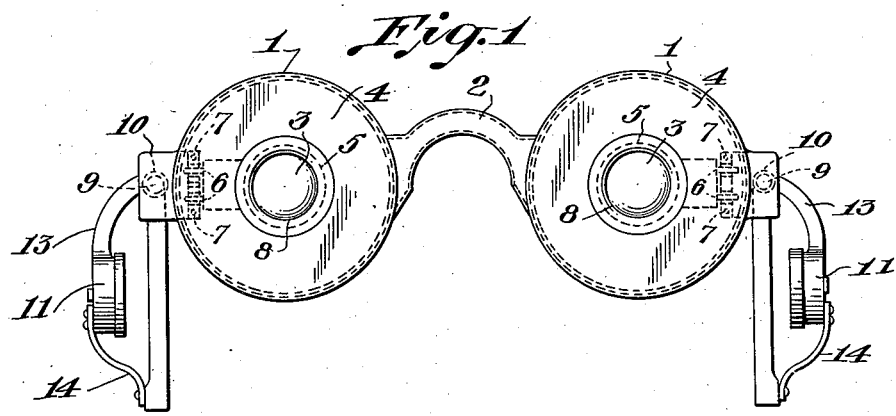
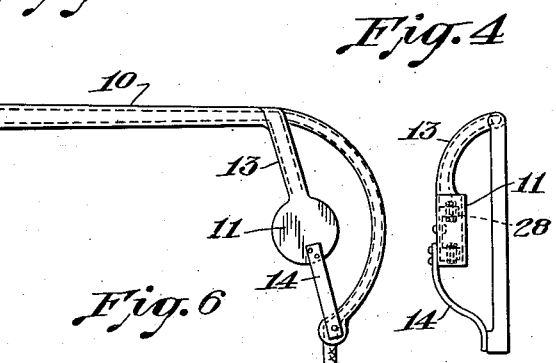
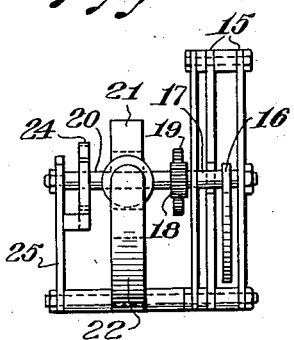
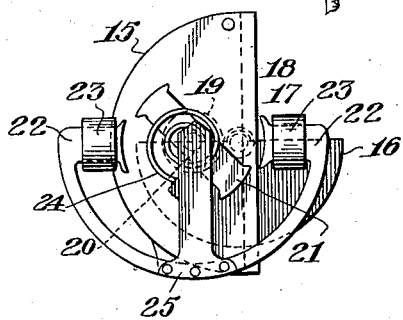
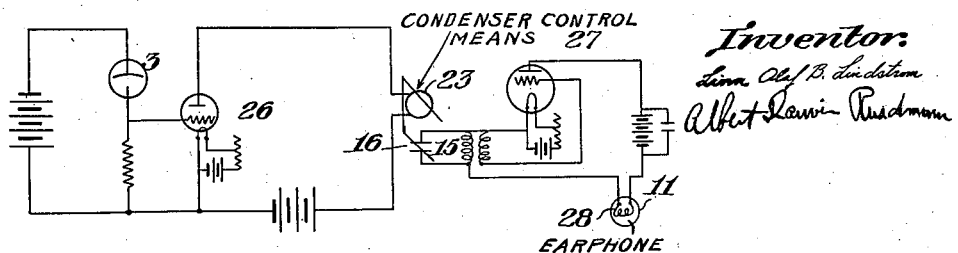

Patented Aug. 25, 1931                                                                                1,820,357

UNITED STATES PATENT OFFICE

LINN OLAF B. LINDSTROM, OF SAN FRANCISCO, CALIFORNIA, AND ALBERT DARWIN RUEDEMANN, OF CLEVELAND, OHIO

VISION-TONE DEVICE

Application filed February 15, 1929. Serial No. 340,297.

The invention relates to a device in which a photo-electric cell is caused to vary the frequency of an oscillatory circuit in proportion to a variation in light intensity and the parts making up the means thereto combined in a device convenient for the use of blind people, or by people subjected to a kind of light which would be harmful to direct vision.

One form of the invention is illustrated in the accompanying drawings in which Figure 1 is a front view of photo electric cell holders and ear phone supports; Fig. 2, a side sectional view of the photo-electric cell holder; Fig. 3, a side view of the photo-electric cell holder and ear phone supports; Fig. 4 a side view section of the ear phone and ear phone supports; Fig. 5 a side view of the current control variable condenser; Fig. 6 a top view of the current control variable condenser; and Fig. 7 a wiring diagram showing electrical connections.

The photo-electric cell holders 1, 1, are connected together and held in place by the hollow nose piece 2. The photo-electric cells 3, 3 are supported in their respective holders 1 and 1 by the cover plate 4, 4 and back support 5, 5. The cell terminals 6, 6 connect to the terminal clips 7, 7 where conductor connections are made. The cover plates 4, 4, have the openings 8, 8, to admit light to the cells 3, 3. The conductor cable 9, 9 goes through the hollow ear stems 10, 10, to the ear phones 11, 11. In addition one stem 10 as shown in Fig. 3, carries the cable 12 which has all conductors leading to the battery supply, tube amplification, and conductors leading back from the current control variable condenser shown in Figs. 5, 6 and 7. The ear phones 11, 11 are supported by the arms 13, 13 and by the straps 14, 14.

The current control variable condenser Fig. 5, Fig. 6 has the fixed plates 15, 15 and the movable plate 16, attached to the shaft 17, which has the gear 18, which meshes with the gear 19, of the shaft 20. This shaft 20 is fixed to the permanent magnet armature 21, which is attracted by the magnet poles 22, 22 having the current coils 23, 23. The armature 21 pulls against the spiral spring 24 when attracted by the magnet poles 22, 22 which are energized in proportion to the current in magnet coils 23, 23. The shaft 20 is supported on the top by the arm 25.

Fig. 7 shows a conventional photo-electric cell circuit where 3 is the photo-electric cell the current of which may be amplified by the tube 26 for energizing the magnet coils 23, 23 of the current control variable condenser, the terminals of which are connected in an oscillatory circuit 27 to vary the frequency of the voltage impressed on the ear phone coils, 28, 28.

Each photo-electric cell 3, 3 controls the frequency or tone on the corresponding ear phone 11, 11 located directly back of the respective cells. Each circuit is separate but are identical as to amplification and condenser control to their respective ear phones. There may therefore be different tones on each ear phone 11, 11 depending on light received on the corresponding cells 3, 3 located directly ahead.

We are aware that the photo-electric cell, the ear phone, the plate condenser, the photo-electric cell circuit and the oscillatory tube circuit have been made and used prior to this invention and we do not claim invention of these devices or circuits.

We claim:

1. A vision-tone device comprising a light sensitive element and means for causing a change in frequency in an eletrically oscillating tube circuit with a change in current through the light sensitive element, such means including a current controlled variable condenser, having fixed and movable plates, with its plates connected in the oscillating circuit, magnetic means for adjusting the position of said movable plate, and connections between said light sensitive element and said magnetic means.

2. A photo-electric or light sensitive cell holder having the cells mounted directly in front of the eye positions with a connecting nose piece and ear phones mounted on the ear stems to the cell holders.

3. The combination of photo-electric or light sensitive cell and ear phones mounted on a common holder whereby the left cell controls the tune of the left ear phone and the right cell controls the tune of the right ear phone.

4. A vision-tone device comprising a light sensitive element, an amplifying circuit connected thereto, a source of current and means for causing a change in frequency in an electrically oscillating circuit with a change in current through the light sensitive element, said means including a current controlled variable condenser, having fixed and movable plates, with the plates connected in the oscillating circuit and having a rotatable magnetic element, which supports the movable plates, that is caused to turn in proportion to the degree of current flowing through the magnet element which is in the amplifying circuit of the light sensitive element, and earphones connected to said oscillating circuit.

5. A vision-tone device comprising a holder to mount a light sensitive or photo-electric cell in front of each eye position and connecting nose piece between such holders, said light sensitive or photo-electric cells being in separate identical circuits, such circuits comprising a source of current for the cells, an amplifying tube circuit for amplifying the cell current, a source of current for said amplifying circuit, a current controlled variable condenser, having fixed and movable plates, with its plates in a tube oscillating circuit, and having a rotatable magnetic element which supports the movable plates connected in the amplified current circuit from the light sensitive cell, a tube oscillating circuit, a source of current therefor, and with a phone or audible device circuit for translating the electrical variations to sound vibrations, such phone or audible device being mounted on the ear stems to the cell holders.

6. In a signaling system, the combination of a photo-electric or light sensitive element, of a source of current therein, a tube amplifying circuit for amplifying the current flowing through said light sensitive or photo-electric cell, a source of current for said amplifying circuit, a current controlled variable condenser, having fixed and movable plates, rotatable magnet element supporting the movable plates of the condenser with the magnet element in the circuit of the amplified current as controlled by the light sensitive cell, and said condenser having its plates in an oscillating tube circuit so that a change in cell current produces a change in plate position and accordingly a change in frequency in the oscillating tube circuit, said oscillatng tube circuit being connected to an audible device for translating the electrical variations to sound variations.

LINN OLAF B. LINDSTROM.
ALBERT DARWIN RUEDERMANN.